Dec. 6, 1932.                J. C. SABEL                1,889,794
                        MICROSCOPE OBJECTIVE
                         Filed Jan. 3, 1931
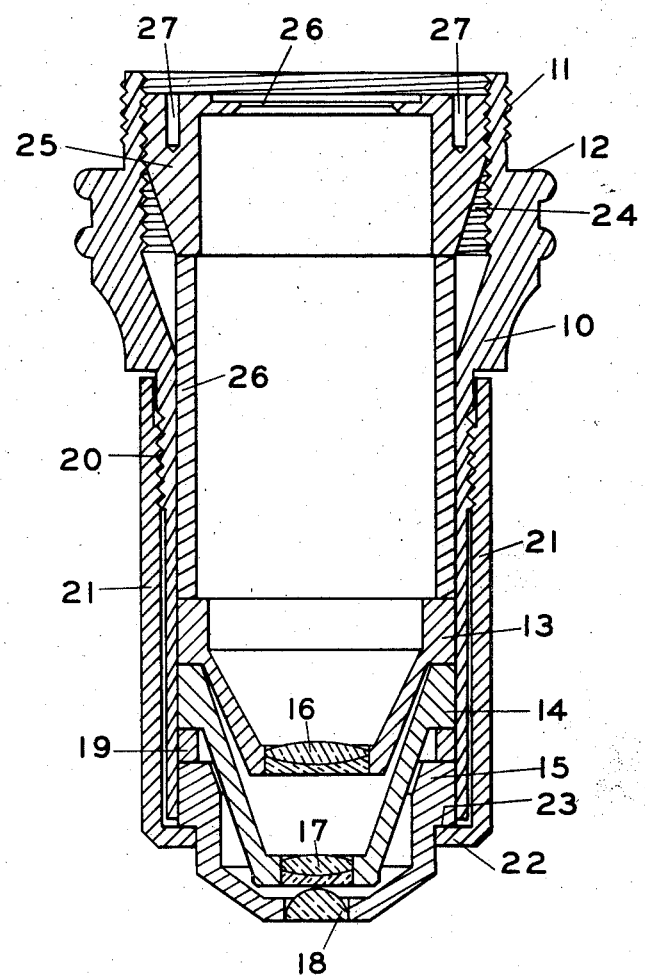
JOHN C. SABEL
            INVENTOR
BY
      G. A. Ellestad
                ATTORNEY Patented Dec. 6, 1932

1,889,794

UNITED STATES PATENT OFFICE

JOHN C. SABEL, OF ROCHESTER, NEW YORK, ASSIGNOR TO BAUSCH & LOMB OPTICAL COMPANY, OF ROCHESTER, NEW YORK, A CORPORATION OF NEW YORK

MICROSCOPE OBJECTIVE

Application filed January 3, 1931. Serial No. 506,387.

This invention relates to optical instruments and more particularly it has reference to mountings for lens systems such as are embodied in microscope objectives, for example.

One of the objects of my invention is to provide an improved mounting of the character described. Another object is to provide an objective mounting embodying novel and improved means for effecting parfocalizing when assembling the parts thereof. Still another object is to provide a mounting in which the lens elements can be easily centered so that the optical axes of the lens elements will be coincident with the axis of the mounting. These and other objects and advantages reside in certain novel features of construction, arrangement and combination of parts as will hereinafter be more fully described and pointed out in the appended claims.

The figure of the drawing shows a vertical sectional view of a microscope objective embodying my invention. The mounting comprises a tubular member 10 which has a threaded portion 11 by means of which the objective is attached to the body tube or nose piece of a microscope so that the end of the tube or nose piece flange abuts against the shoulder 12 on the objective. The lens cells 13, 14 and 15, carrying, respectively, lenses 16, 17 and 18, are slidably positioned within the smooth bore of the tubular member 10. A spacing member 19 is disposed between cells 14 and 15 so as to provide the proper distance between lenses 17 and 18.

Threaded to the outer wall of tubular member 10, by threads 20, is the cylindrical tube or casing 21 having an inwardly extending flange 22 abutting against the shoulder 23 on the lower lens cell 15. Adjustably secured to the inner wall of tubular member 10, by threads 24, is the retaining member or nut 25 which bears against the cylindrical spacing member 26 which, in turn, bears against the top lens cell 13. The nut 25 is provided with the diaphragm opening 26' which may be of any suitable size. The nut 25 also has two holes 27 with which a spanner wrench cooperates in order to facilitate adjustment of the nut.

A group of objectives is said to be parfocal when each optical system has been adjusted relatively to a fixed portion or shoulder, on the objective, which bears a fixed relation to the microscope body tube to which the objective is attached. Thus, when several parfocal objectives, each of a different power, are attached to a revolving nose piece, very little, if any, focusing adjustment is necessary when passing from one objective to another. In a series of objectives, manufactured according to my invention, the shoulder 12 acts as a limiting stop when the objective is screwed into the microscope body tube or attached to a revolving nose piece. Hence, the series of objectives may be parfocalized by adjusting the optical system of each objective with respect to the shoulder 12. This parfocalizing adjustment can be readily effected, in my improved objective, by relative adjustments of the nut 25 and the threaded tube or casing 21. Such a means for effecting a parfocal adjustment greatly facilitates and cheapens the manufacture of objectives. Under prior art methods parfocalizing is usually obtained by turning down a spacing ring and then trying it in the objective and continuing until the desired results are obtained.

Another advantage of my improved structure resides in the fact that the lens cells 13, 14 and 15 are mounted directly within the bore of the tubular member 10. Hence, the lens elements 16, 17 and 18 are securely held so that they are centered with respect to the axis of the tubular member 10. Since the threads 11 and the shoulder 12 are cut with respect to the axis of the tubular member 10, the optical axis of the objective will coincide with the axis of the body tube to which it is attached.

From the foregoing it will be apparent that I am able to attain the objects of my invention and provide an improved objective mounting which will embody improved means for effecting parfocalizing adjustments and insure proper centering of the lens elements with respect to the axis of the mounting which is attached to the body tube of a microscope. Various modifications can obviously be made without departing from the spirit of my invention.

I claim:

1. An objective comprising a tubular member having a smooth inner bore, two spaced retaining members threadedly secured to said tubular member, lens cells carrying lenses, said cells being concentrically and snugly fitted within said bore and slidable on the walls thereof, said cells being held between said retaining members whereby said lenses may be secured in adjusted position within the bore of the tubular member.

2. An objective comprising a tubular member having a smooth inner wall, lens cells slidably mounted on the wall within said tubular member, a casing member threaded to said tubular member, a retaining member threaded to said tubular member, said casing member and retaining member serving to retain said lens cells in adjusted position within said tubular member.

3. In a device of the character described, the combination of a tubular member having attaching threads and a shoulder adjacent thereto, lens cells slidably mounted within said tubular member, a casing threaded to said tubular member, said casing having an inwardly projecting flange abutting against one of said cells and a retaining member threaded to the inner wall of said tubular member for holding said cells in adjusted position with respect to said shoulder.

4. A microscope objective comprising a tubular member having a shoulder portion, a plurality of lens cells slidably mounted within said tubular member, a lens carried by each of said cells, a casing threadedly secured to said tubular member, said casing having an inwardly extending flange which abuts against one of said cells, a spacing member abutting against another of said cells within said tubular member and an apertured nut threaded to the inner walls of said tubular member and abutting against said spacing member.

5. A microscope objective comprising a tubular member having attaching threads and a shoulder adjacent thereto, said member having an inner cylindrical opening, lens cells carrying lenses, said cells being snugly fitted and slidably disposed within said opening, two spaced members threadedly secured to said tubular member, said cells being mounted between said spaced members whereby said lenses may be adjustably positioned with respect to said shoulder for the purpose of parfocalizing.

JOHN C. SABEL.